United States Patent
Teuwen et al.

(10) Patent No.: US 9,693,224 B2
(45) Date of Patent: Jun. 27, 2017

(54) RESTRICTING SOFTWARE TO AUTHORIZED WIRELESS ENVIRONMENTS

(71) Applicant: NXP B.V., Eindhoven (NL)

(72) Inventors: Philippe Teuwen, Etterbeek (BE); Peter Rombouts, Sint-Katelijne-Waver (BE); Frank Michaud, Etterbeek (BE)

(73) Assignee: NXP B.V., Eindhoven (NL)

(*) Notice: Subject to any disclaimer, the term of this patent is extended or adjusted under 35 U.S.C. 154(b) by 384 days.

(21) Appl. No.: 14/105,526

(22) Filed: Dec. 13, 2013

(65) Prior Publication Data

US 2015/0172917 A1 Jun. 18, 2015

(51) Int. Cl.
| | |
|---|---|
| H04L 29/06 | (2006.01) |
| H04W 12/04 | (2009.01) |
| G06F 21/12 | (2013.01) |
| H04W 4/00 | (2009.01) |
| H04W 12/08 | (2009.01) |
| H04W 88/06 | (2009.01) |

(52) U.S. Cl.
CPC .......... *H04W 12/04* (2013.01); *G06F 21/121* (2013.01); *H04L 63/0428* (2013.01); *H04L 63/123* (2013.01); *H04W 4/008* (2013.01); *H04W 12/08* (2013.01); *H04L 2463/101* (2013.01); *H04W 88/06* (2013.01)

(58) Field of Classification Search
CPC ..... H04W 12/04; H04W 12/08; H04W 4/008; H04W 88/06; H04L 63/123; H04L 63/0428; G06F 21/121
USPC .......................................................... 380/28
See application file for complete search history.

(56) References Cited

U.S. PATENT DOCUMENTS

| | | | |
|---|---|---|---|
| 8,250,377 B2 | 8/2012 | Png et al. | |
| 8,321,913 B2 * | 11/2012 | Turnbull | H04L 63/0492 726/2 |
| 8,660,485 B2 | 2/2014 | Burtt | |
| 9,280,692 B2 | 3/2016 | Arnitz | |

(Continued)

FOREIGN PATENT DOCUMENTS

| | | |
|---|---|---|
| CN | 101216897 A | 7/2008 |
| CN | 101253533 A | 8/2008 |

(Continued)

OTHER PUBLICATIONS http://www.motorola.com/us/motorola-skip-moto-x/Motorola-Skip-for-Moto-X/motorola-skip-moto-x.html, Nov. 26, 2013.

(Continued)

*Primary Examiner* — John B King

(57) ABSTRACT

An apparatus for restricting execution of software is disclosed. The apparatus includes a telecommunication device configured to communicate with a wireless device (e.g., an RFID device) using a first wireless communication protocol. The telecommunication device is configured to determine whether or not the telecommunication device is located in an authorized wireless environment, based on wireless devices detected by the telecommunication device. The telecommunication device is also configured to execute a program in response to determining that it is located in an authorized wireless environment. Conversely, the telecommunication device is also configured to inhibit execution of the program in response to determining that it is not located in an authorized wireless environment.

19 Claims, 4 Drawing Sheets

(56) References Cited

U.S. PATENT DOCUMENTS

| | | |
|---|---|---|
| 2002/0087873 A1 | 7/2002 | Zunke |
| 2005/0143095 A1* | 6/2005 | Jacob ............... H04W 4/02 455/456.3 |
| 2007/0037526 A1* | 2/2007 | Estable ............ H04W 52/0241 455/74.1 |
| 2007/0074024 A1 | 3/2007 | Cheong et al. |
| 2011/0207434 A1 | 8/2011 | Rozhkov |
| 2013/0152185 A1* | 6/2013 | Singh ............... G06F 21/35 726/9 |
| 2014/0172700 A1 | 6/2014 | Teuwen et al. |
| 2014/0266624 A1* | 9/2014 | Van Bosch ............ G06K 7/087 340/10.1 |

FOREIGN PATENT DOCUMENTS

| | | |
|---|---|---|
| CN | 102165472 A | 8/2011 |
| EP | 1 220 075 A1 | 7/2002 |
| WO | 2006/003546 A2 | 1/2006 |

OTHER PUBLICATIONS http://www.xda-developers.com/android/unlock-your-phone-using-nfc/, Oct. 11, 2013.
https://play.google.com/store/apps/details?id=com.t3hh4xx0r.nfcsecure&hl=en, Oct. 28, 2013.
https://play.google.com/store/apps/details?id=co.mclear.nfcringunlock, Nov. 26, 2013.
European Extended Search Report for Patent Appln. No. 14192696.4 (May 19, 2015).

* cited by examiner

RESTRICTING SOFTWARE TO AUTHORIZED WIRELESS ENVIRONMENTS

Aspects of various embodiments are directed to restricting execution of software programs.

Development of software requires considerable investment in terms of both time and finance. Unauthorized use of software such as unauthorized copying or sharing ultimately results in loss of income for the software developer. Examples of unauthorized software can include copies made by third parties without obtaining the necessary authorization, or sharing of unauthorized copies via the Internet. Further, an authorized licensee of a software program may install the program on more devices than they are entitled to by the license—thereby only paying for a fraction of the actual use.

Various example embodiments are directed toward circuits and methods for preventing unauthorized execution of software. In some various embodiments, a wireless device is configured to allow or inhibit execution of a program, depending on whether or not the apparatus is operating in an authorized wireless environment. The wireless environment may be determined, for example, based on other wireless devices and/or signals detected by the wireless device.

In some embodiments, an apparatus is provided that includes a processing device and a radio-frequency identification (RFID) device configured to communicate with each other using a first wireless communication protocol. The processing device is configured to determine whether or not it is located in an authorized wireless environment based on wireless devices that are detected. This includes determining whether or not the RFID device is detected. The processing device executes a program in response to determining the wireless device is located in an authorized wireless environment. Conversely, the processing device inhibits execution of the program in response to determining the wireless device is not located in an authorized wireless environment.

In some embodiments, an apparatus is disclosed that includes a telecommunication device configured to place and receive calls using a first wireless communication protocol and communicate with a wireless device using a second wireless communication protocol. The telecommunication device is configured to determine whether or not it is located in an authorized wireless environment, based on whether or not the wireless device is detected by the telecommunication device. The telecommunication device is configured to execute a program in response to determining the telecommunication device is located in an authorized wireless environment. Conversely, the telecommunication device is configured to inhibit execution of the program in response to determining the telecommunication device is not located in an authorized wireless environment.

In some embodiments, an apparatus is disclosed that includes an RFID device and a telecommunication device. The telecommunication device is configured to place and receive calls using a first wireless communication protocol and communicate with the RFID device using a second wireless communication protocol. The telecommunication device is further configured to determine whether or not it is located in an authorized wireless environment, based on other wireless devices detected by the first wireless device including at least the RFID device. The telecommunication device is configured to execute a program in response to determining that it is located in an authorized wireless environment. Conversely, the telecommunication device is configured to inhibit execution of the program in response to determining that it is not located in an authorized wireless environment.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
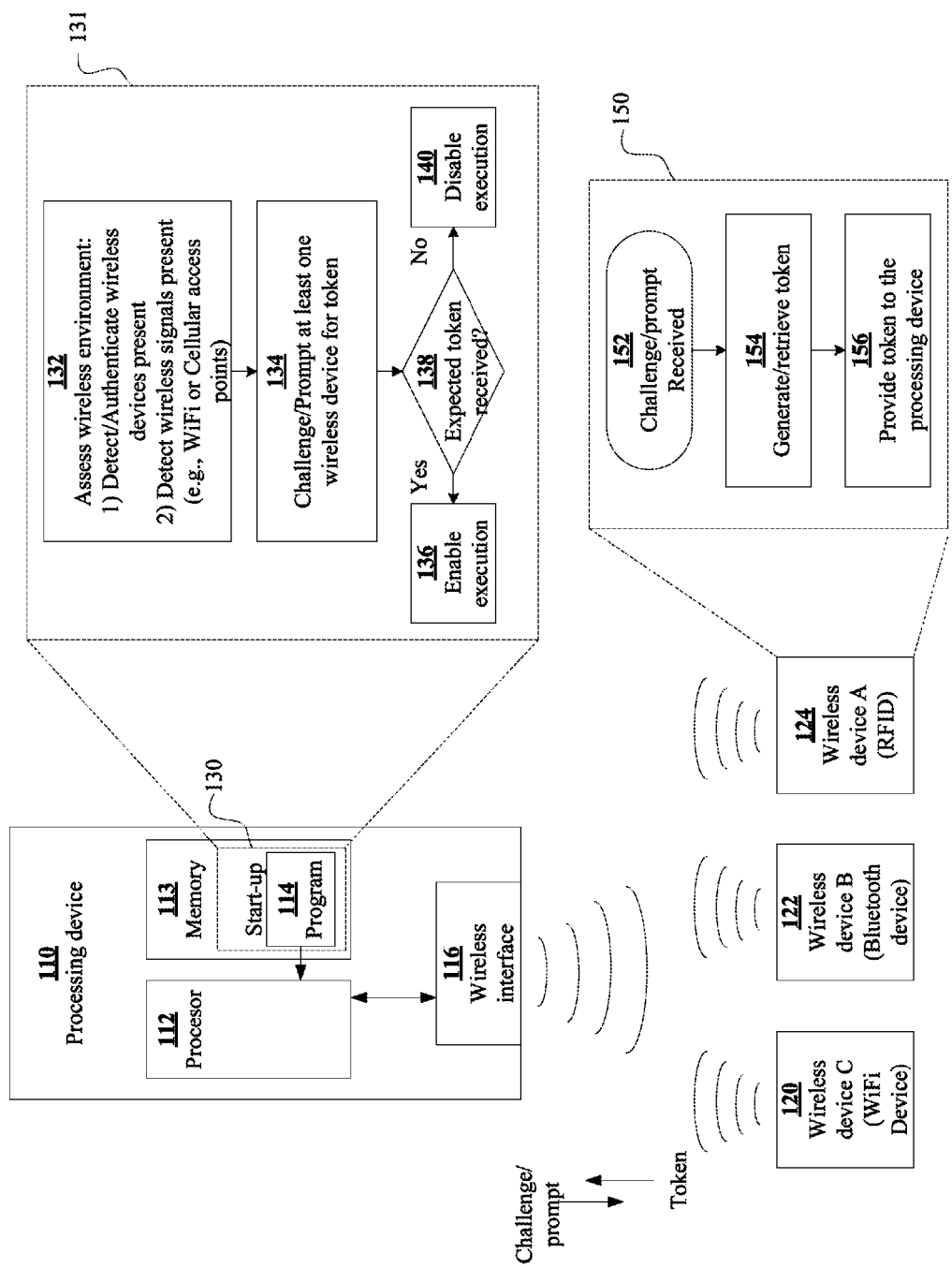
FIG. 1 shows an apparatus for restricting execution of programs.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of apparatuses and systems configured for execution of software programs. Some of the disclosed embodiments restrict execution of software programs by binding the operation of the software to one or more wireless devices and requiring that the wireless devices be present for correct execution. The required wireless devices may include various wireless devices that may be used to identify a particular location or a particular user.

In some various embodiments, a processing device is configured to allow or inhibit execution of a program, depending on whether or not the apparatus is operating in an authorized wireless environment. The wireless environment may be determined, for example, based on wireless devices and/or signals detected by the processing device. In some embodiments, an apparatus is disclosed that includes a processing device configured to communicate with one or more wireless devices, using one or more wireless communication protocols. The processing device is configured to determine whether or not it is located in an authorized wireless environment, based on whether or not the wireless device is detected by the processing device. The processing device is configured to inhibit execution of the program in response to determining that it is not located in an authorized wireless environment.

The disclosed embodiments are applicable to a variety of processing devices having one or more processors for executing programs therein. For ease of explanation, examples are primarily described with reference to a wireless telecommunication device having a processor for executing one or more programs. Wireless telecommunication devices (e.g., voice over IP (VoIP) devices, computers, and/or mobile phones) allow users to send and receive messages (e.g., voice calls, email, and SMS messages) over various wireless phone and data networks (e.g., cellular networks and WiFi networks). While not necessarily so limited, various aspects may be appreciated through a discussion of examples using this context.

In some embodiments, an apparatus is disclosed that includes a telecommunication device that is configured to place and receive calls using a first wireless communication protocol. The telecommunication device is also configured to communicate with a wireless device using a second wireless communication protocol. The telecommunication device is configured to determine whether or not it is located in an authorized wireless environment, based on whether or not the wireless device is detected by the telecommunication device. The telecommunication device is configured to inhibit execution of the program in response to determining the telecommunication device is not located in an authorized wireless environment.

The determination of whether or not a telecommunication device is located in an authorized environment may be based on the presence and/or absence of one or more various wireless devices including, for example, RFID devices, Bluetooth devices, WiFi devices, and/or cellular devices. For example, in some embodiments, the telecommunication device may inhibit execution of a program unless one or more specific wireless devices are detected. Identity of specific wireless devices may be verified using cryptographic verification methods (e.g., cryptographic challenge/response handshake) or non-cryptographic verification methods (e.g., token exchange). Binding operation of a program to one or more wireless devices may be performed without restricting execution of a program to any particular device. This approach may be useful in certain scenarios to allow an authorized user to access a program on different devices without having to transfer a license from one device to the next.

Figure 2:
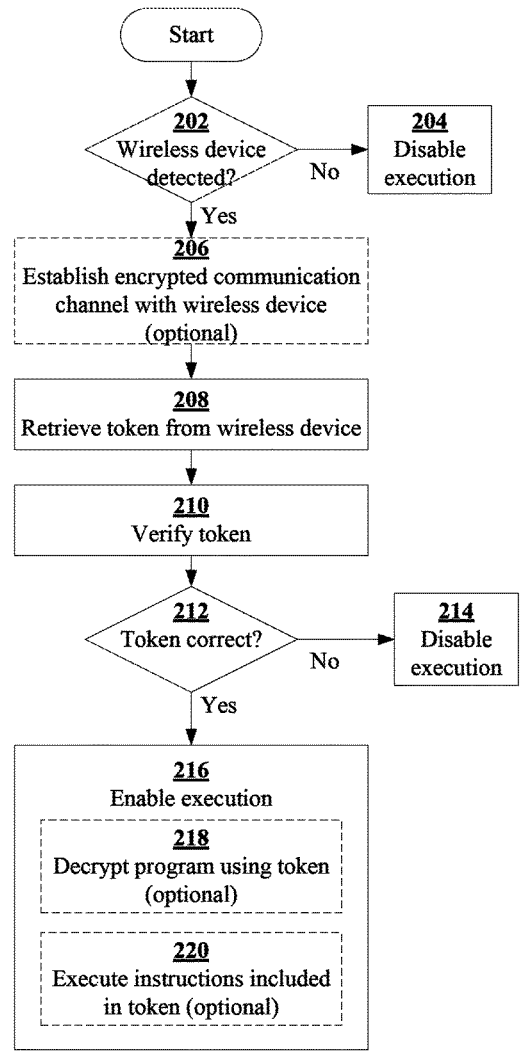
FIG. 2 shows a first process for restricting execution of a program.
Figure 4:
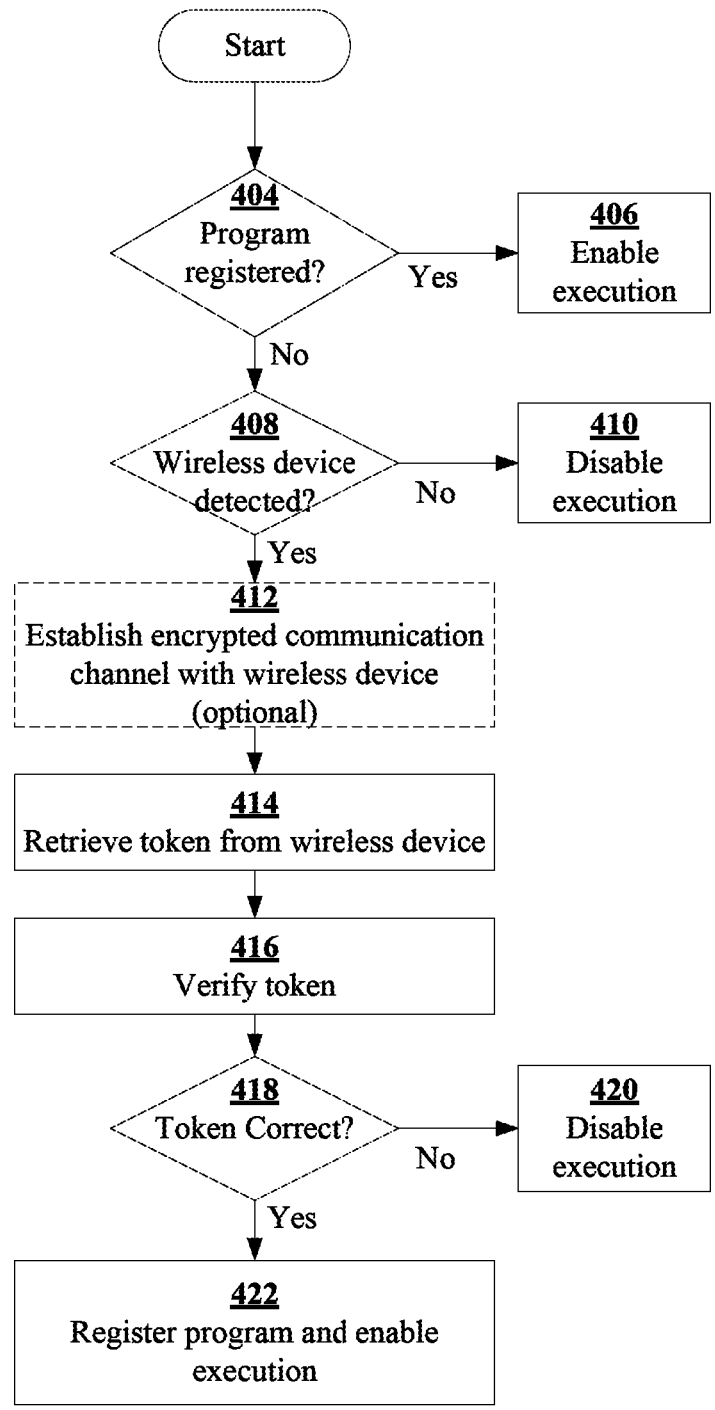
FIG. 4 shows a process for restricting execution and registration of a program.

As indicated above, various embodiments may determine whether or not a telecommunication device is located in an authorized environment based on detection of various wireless devices including, e.g., RFID devices, Bluetooth devices, WiFi devices, cellular devices, and/or wireless devices utilizing other wireless communication protocols (e.g., ZigBee). Although embodiments are not so limited, for ease of explanation, examples herein may be primarily described with reference to detection of RFID devices. RFID devices are devices configured to wirelessly provide data (e.g., a token) to a reader that may be used to identify or authenticate the device. For additional information regarding RFID devices and circuits for RFID communication, reference can be made to U.S. Application No. 20120208459, filed Jan. 25, 2012 and U.S. Application No. 20080231424, filed Aug. 25, 2006, which are commonly assigned to the assignee of the instant application, and which are fully incorporated herein in their entirety by reference. FIGS. 1, 2, and 4 of the U.S. Application No. 20120208459 shows various circuits that may be used for communication in RFID devices. FIGS. 1, 2, and 10 of the U.S. Application No. 20080231424 show various circuits that may be used to implement RFID devices and RFID readers.

Different embodiments may utilize different mechanisms to inhibit execution of a program when a telecommunication device is not located in an authorized wireless environment. In some implementations, a token from a specific wireless device may be required for correct execution of the program. For instance, in some implementations, the program includes a cryptographic algorithm, and the first wireless device is further configured to utilize the token as part of the cryptographic algorithm to verify authenticity of the token. In some implementations, a set of executable instructions that form a portion of the program may be provided as part of the token. The set of instructions are executed by the telecommunication device during the execution of the program. If the instructions are not provided as part of the token, correct execution of the program is prevented.

In some embodiments, a wireless device is configured to provide the token in response to a challenge message. In some implementations, the token may be generated as a function of the challenge message. For instance, in some implementations, the wireless device may perform mathematical operations (e.g., cryptographic operations) on the challenge message to generate the token. In some implementations, the challenge message includes an encrypted portion of the program. The encrypted portion of the program is decrypted by the wireless device and provided back to the telecommunication devices as the token.

In some embodiments, the telecommunication device is configured and arranged to establish an encrypted communication channel with the wireless device. The encrypted communication channel is then used to provide the token to the telecommunication device.

Turning now to the figures, FIG. 1 shows an apparatus for restricting execution of programs. The apparatus includes a processing device 110 (e.g., a smartphone, tablet, and/or VoIP device) having a processor 112 for executing programs (e.g., program 114) stored in a memory 113. The processing device 110 also includes a wireless interface 116 for communicating using one or more wireless communication protocols. For each wireless communication protocol that is supported, the wireless interface 116 may include a corresponding transceiver circuit configured to transmit and receive data according to the wireless communication protocol. The apparatus also includes one or more wireless devices (e.g., 120, 122, or 124) whose presence is used to indicate an authorized wireless environment.

The processing device 110 is configured to determine whether or it is located in an authorized wireless environment, based on whether one or more specific wireless devices (e.g., 120, 122, or 124) are detected by the processing device 110. For instance a list of wireless devices indicative of an authorized wireless environment may be stored in the memory 113 as part of the program. As indicated above, wireless devices used to indicate the authorized wireless environment may communicate using various wireless communication protocols including, e.g., WiFi, Bluetooth, and/or RFID based protocols. The processing device 110 is configured to allow execution of the program 114 if one or more specific wireless devices is detected by the processing device 110. Otherwise, if the specific wireless devices are not detected by the processing device 110, execution of the program 114 is inhibited.

As one specific example, an RFID tag 124 required for correct execution may be provided with the purchase of program 114. The RFID tag 124 may be affixed to the case of the processing device 110 on which the program 114 is installed. If the program 114 is executed on the authorized device, the RFID tag will be detected by the processing device and the program 114 will be allowed to execute. However, if the program is illegally copied and installed on an unauthorized device, the RFID tag will not be detected by the unauthorized device, and execution of the program will be prevented.

Various embodiments may include various circuits configured to perform the determination of the wireless environment and the enabling/disabling of a program in response thereto. For example, one or more modules are discrete logic circuits or programmable logic circuits, and may be configured to implement these operations. In some embodiments, the processor 112 may be configured to execute software instructions that cause the processor to operate as a specially configured machine for determining the wireless environment and the enabling/disabling of a program in response to the determination. For example, in some embodiments, the program 114, to be enabled/disabled as a function of the wireless environment, is encapsulated by a start-up function 130 that is executed prior to execution of the program. The start-up function configures the processor to implement a specially configured circuit that is responsive to input from the wireless interface circuit 116 and inhibits execution of the program if the particular wireless device (e.g., RFID tag 124) is not detected by the wireless interface circuit 116.

For example, in some embodiments, when the start-up function 130 is executed, the processor 112 is configured to perform the processes 131 shown in FIG. 1. The wireless environment is assessed at block 132 to determine if the processing device is operating in an authorized wireless environment. As indicated above, the assessment may include detecting and/or authenticating wireless devices that are within range of the processing device 110. In some implementations, the assessment of the wireless environment may also be based on the presence/absence of particular wireless signals (e.g., from WiFi or cellular access points). At block 134, the process challenges/prompts at least one of the wireless devices for a token. If the expected token is received, decision block 138 directs the process to enable execution of the program at block 136. Otherwise, decision block 138 directs the process to disable execution of the program at block 140.

Block 150 shows an example process that may be performed by a wireless device (e.g., RFID tag 124). In response to receiving a challenge/prompt message 152, a token is generated or retrieved at block 154. At block 156, the token is provided to the processing device 110.

Various embodiments may utilize different processes to enable or inhibit execution of a program on a processing device (e.g., a telecommunication device), based on the wireless environment in which the processing device is located. FIG. 2 shows a first process for restricting execution of a program. If no wireless device is detected, decision block 202 directs the process to disable execution of the program at block 204. If a wireless device is detected, the process retrieves a token from the wireless device at block 208. In some implementations, the process may establish an encrypted communication channel with the wireless device at block 206. Retrieval of the token at block 208 is performed using the encrypted communication channel. The token is verified at block 210. If the token is not valid, decision block 212 directs the process to disable execution of the program at block 214. If the token is valid, decision block 212 directs the process to enable execution of the process at block 216. The process may use a number of different mechanisms to enable/disable execution of a program. In some embodiments, the program must be decrypted with the token at block 218 before it may be executed. In some other embodiments, a portion of the program is provided by the token and is executed as part of the program at block 220.

Figure 3:
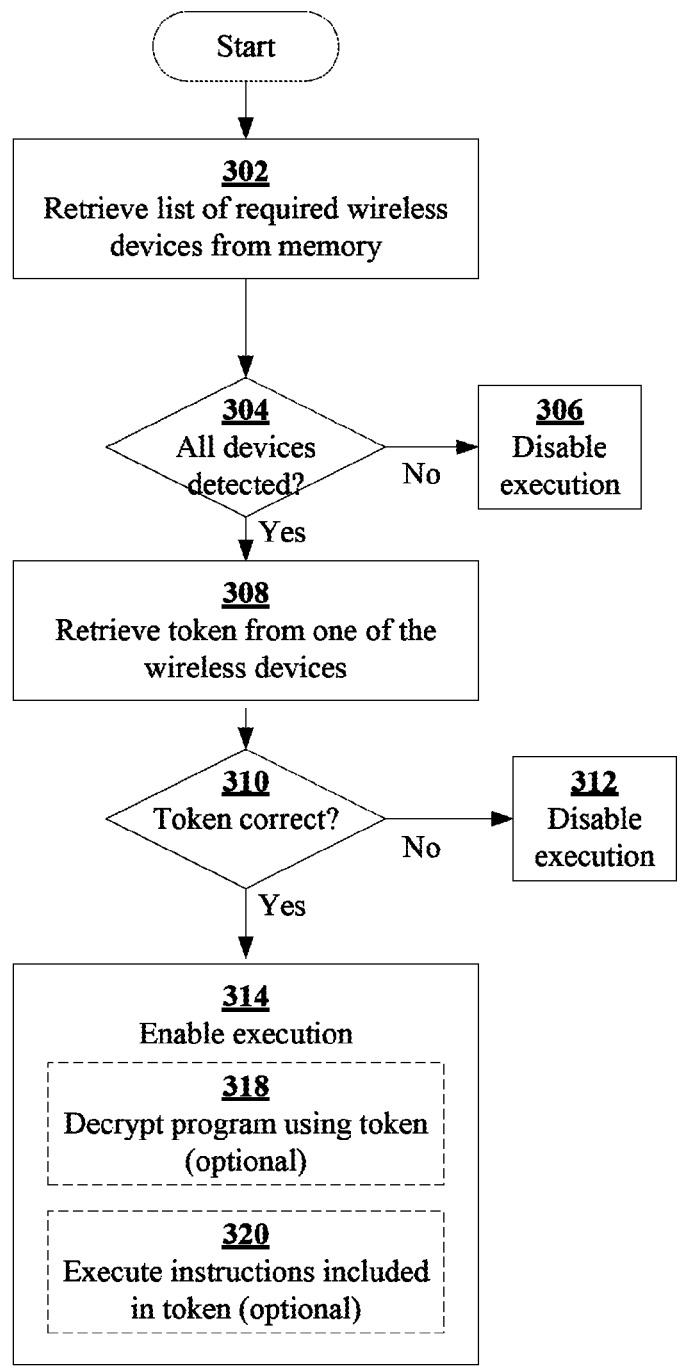
FIG. 3 shows a second process for restricting execution of a program.

In some embodiments, multiple wireless devices may be required to be present before execution of the program is enabled. FIG. 3 shows a second process for restricting execution of a program. In this example, a list of required wireless devices is retrieved from memory at block 302. If one or more of the devices in the list are not detected, decision block 304 directs the process to disable execution of the program at block 306. If all of the devices in the list are detected, decision block 304 directs the process to retrieve a token from one of the wireless devices at block 308. If the retrieved token is invalid, decision block 310 directs the process to disable execution of the program at block 312. If the retrieved token is valid, decision block 310 directs the process to execution of the program at block 314.

As described with reference to FIG. 2, the process may use a number of different mechanisms to enable/disable execution of a program. In some implementations, the program must be decrypted with the token at block 318 before it may be executed. In some other embodiments, a portion of the program is provided by the token and is executed as part of the program at block 320.

In some embodiments, a start-up function may verify the processing device is located within an authorized wireless environment each time a program is executed. In some other embodiments, a start-up function may only require verification of an authorized wireless environment when the program is registered after is it installed on a processing device. This approach allows less restrictive use of the program after installation, while providing a mechanism to prevent software from being freely distributed over the internet and used without a license.

FIG. 4 shows a process for restricting execution and registration of a program. In this example, the process first determines if a program has been registered when the program is to be executed. If the program has been registered, decision process 404 directs the process to enable execution of the program at block 406. If the program is not registered, decision process 404 directs the process to determine if any wireless devices are detected at decision block 408. If no wireless devices are detected at decision block 408, execution of the program is disabled at block 410. If one or more wireless devices are detected at decision block 408, the process retrieves a token from the wireless device at block 414. In some implementations, the process may establish an encrypted communication channel with the wireless device at block 412. Retrieval of the token at block 414 is then performed using the encrypted communication channel. The token is verified at block 416. If the token is not valid, at decision block 418, execution of the program is disabled at block 420. If the token is valid, the program is registered and execution of the program is enabled at block 422.

Aspects of the above examples may be used in conjunction with other security techniques in a number of applications. For instance, in some embodiments, execution of a program may be limited to prevent white-box attacks, in which an attacker executes the program in an environment/platform where the attacker has complete control (e.g., IDA Pro, debuggers, and/or emulators). This type of attack may be inhibited by preventing the execution of at least a portion of the program unless an authorized wireless environment is detected, as described in the above examples. In some embodiments, white-box encryption and/or obfuscation techniques may be used to provide additional protection against white-box attacks. In some implementations, the white-box encryption and/or obfuscation techniques may also utilize one or more of the wireless devices. For example, during execution of the program, one or more functions may be required to be decrypted using a cryptographic key, included in a token provided by a specific RFID device. As another example, one or more functions of the program may be decrypted on one of the wireless devices. In this manner, cryptographic keys used by the program will not be retrievable by an attacker if not executed in an authorized wireless environment.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities. For example, in certain of the above-discussed embodiments, one or more modules are discrete logic circuits or programmable logic circuits, configured and arranged for implementing these operations/activities. In certain embodiments, such a programmable circuit is one or more computer circuits, programmed to execute a set (or sets) of instructions (and/or configuration data). The instructions (and/or configuration data) can be in the form of firmware or software stored in and accessible from a memory (circuit). As an example, first and second modules may include a combination of a CPU hardware-based circuit and a set of instructions in the form of firmware, where the first module includes a first CPU hardware circuit with one set of instructions and the second module includes a second CPU hardware circuit with another set of instructions. Certain embodiments are directed to a computer program product (e.g., nonvolatile memory device), which includes a machine or computer-readable medium having stored thereon instructions which may be executed by a computer (or other electronic device) to perform these operations/activities.

In a specific example, a detailed non-limiting implementation of the disclosure includes both an RFID device and a telecommunication device in wireless communication with each other. The RFID device is implemented using a passive RFID tag, as described with reference to FIG. 2 in U.S. Application No. 20080231424. The telecommunication device is implemented using a device (e.g., a VoIP enabled or a mobile phone) configured to place and received voice calls over a wireless network (e.g., cellular networks and WiFi networks). The telecommunication device is configured and arranged to communicate with the RFID device using a first wireless communication protocol, as exemplified by the ISO 14443 and ISO 15693 communication protocols. In a specific implementation, the telecommunication device includes an RFID reader, as described with reference to FIG. 2 in U.S. Application No. 20080231424, for communicating with the RFID device. The telecommunication device is also configured and arranged, via certain logic that is semi and/or fully-programmable logic (e.g., via a computer processor executing CPU instructions from memory), to determine whether there is a proper/authorized wireless environment for execution of a program. More specifically, the telecommunication device determines whether it is located in an authorized wireless environment, based on wireless devices detected by the telecommunication device, including determining whether or not the RFID device is detected. The telecommunication device then executes a program in response to determining that it is located in an authorized wireless environment, and inhibits execution of the program in response to determining it is not located in an authorized wireless environment.

Based upon the above discussion and illustrations, those skilled in the art will readily recognize that various modifications and changes may be made to the various embodiments without strictly following the exemplary embodiments and applications illustrated and described herein. For example, some embodiments may include a combination of aspects illustrated separately in respective figures. Such modifications do not depart from the true spirit and scope of various aspects of the invention, including aspects set forth in the claims.

What is claimed is:

1. An apparatus comprising:
an RFID device; and
a processing device configured and arranged to
access a list indicative of a plurality of wireless devices;
communicate with the RFID device using a first wireless communication protocol;
determine whether or not the processing device is located in an authorized wireless environment based on a plurality of different signals received by the processing device, the plurality of different signals including signals communicated using the first wireless communication protocol and signals communicated using a second wireless communication protocol that is different from the first wireless communication protocol;
execute a program on the processing device in response to determining the processing device is located in an authorized wireless environment and to retrieve a token from at least one wireless device in the list of wireless devices and verifying authenticity of the token; and
inhibit execution of the program in response to determining the processing device is not located in an authorized wireless environment or being unable to verify authenticity of a token retrieved from at least one wireless device in the list of wireless devices,
wherein the processing device is configured to identify the processing device as being in an unauthorized environment in response to being unable to detect signals from one or more of the plurality of wireless devices in the list.

2. The apparatus of claim 1, wherein
the processing device is configured and arranged to inhibit execution of the program by preventing execution of a portion of the program; and
the determining whether or not the processing device is located in an authorized wireless environment includes determining whether or not a WiFi or a cellular access point is present.

3. The apparatus of claim 1, wherein the RFID device is configured and arranged to provide a token to the processing device, the token being required for correct execution of the program.

4. The apparatus of claim 3, wherein the program includes a cryptographic algorithm, and the processing device is further configured and arranged to utilize the cryptographic algorithm to verify authenticity of the token.

5. The apparatus of claim 3, wherein the token includes processor instructions, and the processing device is further configured and arranged to incorporate the processor instructions into the program and execute the processor instructions during the execution of the program.

6. The apparatus of claim 3, wherein:
the processing device is configured and arranged to establish an encrypted communication channel with the RFID device; and
the RFID device is configured and arranged to provide the token to the processing device using the encrypted communication channel.

7. The apparatus of claim 3, wherein:
the processing device is configured and arranged to provide a challenge message to the RFID device; and
the RFID device is configured and arranged to generate the token as a function of the challenge message.

8. The apparatus of claim 1, wherein the processing device is configured to
   store the list of wireless devices in a memory within the processing device; and
   identify the processing device as being in an unauthorized location, in response to being unable to detect one or more wireless devices indicated in the list of wireless devices in the memory.

9. The apparatus of claim 8, wherein the list of wireless devices includes at least one device configured and arranged to communicate data using a WiFi communication protocol.

10. The apparatus of claim 1, wherein the processing device includes a telecommunication device configured and arranged to place and receive calls using the second wireless protocol.

11. The apparatus of claim 1, further comprising: a memory storing the list.

12. An apparatus comprising:
   a telecommunication device configured and arranged to
      access a list indicative of a plurality of wireless devices;
      place and receive calls using a first wireless communication protocol;
      communicate with a wireless device using a second wireless communication protocol, the second wireless communication protocol being a Bluetooth-based wireless communication protocol, an RFID-based wireless communication protocol, or a WiFi-based wireless communication protocol;
      determine whether or not the telecommunication device is located in an authorized wireless environment based on a plurality of different signals received by the telecommunication device, the plurality of different signals including signals communicated using the second wireless communication protocol and signals communicated using a third wireless communication protocol that is different from the first wireless communication protocol and the second wireless communication protocol;
      execute a program on the telecommunication device in response to determining the telecommunication device is located in an authorized wireless environment and to retrieve a token from at least one wireless device in the list of wireless devices and verifying authenticity of the token; and
      inhibit execution of the program in response to determining the telecommunication device is not located in an authorized wireless environment or being unable to verify authenticity of a token retrieved from at least one wireless device in the list of wireless devices,
      wherein the telecommunication device is configured to identify the telecommunication device as being in an unauthorized environment in response to being unable to detect signals from one or more of the plurality of wireless devices in the list.

13. The apparatus of claim 12, wherein the telecommunication device is configured and arranged to determine whether or not one of the wireless devices is detected by verifying an identity of the wireless device using cryptographic verification methods or non-cryptographic verification methods.

14. The apparatus of claim 12, wherein the telecommunication device is configured and arranged to determine whether or not one of the wireless devices is detected by establishing an encrypted communication channel with the wireless device; and
   verifying an identity of the wireless device via the encrypted communication channel.

15. The apparatus of claim 14, wherein the telecommunication device is configured and arranged to verify the identity of one of the wireless devices by
   communicating a challenge message to the wireless device via the encrypted channel;
   receiving the token from the wireless device via the encrypted channel; and
   determining whether or not the token has a data value equal to a data value stored or computed on the telecommunication device.

16. The apparatus of claim 12, wherein:
   at least one of the wireless devices is configured to provide the token to the telecommunication device, the token including a set of processor instructions; and
   the program is configured to cause the telecommunication device to execute the set of processor instructions during execution of the program.

17. The apparatus of claim 12, further including at least one of the wireless devices.

18. The apparatus of claim 12, wherein the second wireless communication protocol is an RFID-based wireless communication protocol.

19. An apparatus comprising:
   an RFID device; and
   a telecommunication device configured and arranged to
      place and receive calls using a first wireless communication protocol;
      communicate with the RFID device using a second wireless communication protocol that is different from the first wireless communication protocol;
      access a list indicative of a plurality of wireless devices;
      determine whether or not the telecommunication device is located in an authorized wireless environment based on a plurality of different signals received by the telecommunication device, the plurality of different signals including signals communicated using the second wireless communication protocol and signals communicated using a third wireless communication protocol that is different from the first wireless communication protocol and the second wireless communication protocol;
      register a program installed on the telecommunication device in response to the program being unregistered and determining the telecommunication device is located in an authorized wireless environment;
      execute the program in response to the program being registered and to retrieve a token from at least one wireless device in the list of wireless devices and verifying authenticity of the token; and
      inhibit execution of the program in response to the program being unregistered or to being unable to verify authenticity of a token retrieved from at least one wireless device in the list of wireless devices; and
   wherein the telecommunication device is configured to identify the telecommunication device as being in an unauthorized environment in response to being unable to detect signals from one or more of the plurality of wireless devices in the list.

* * * * *